(12) United States Patent
Proust et al.

(10) Patent No.: US 6,216,014 B1
(45) Date of Patent: Apr. 10, 2001

(54) COMMUNICATION SYSTEM FOR MANAGING SAFELY AND INDEPENDENTLY A PLURALITY OF APPLICATIONS BY EACH USER CARD AND CORRESPONDING USER CARD AND MANAGEMENT METHOD

(75) Inventors: Philippe Proust, La Ciotat; Anne Laget, Peypin; Cedric Huet, La Ciotat, all of (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/194,086

(22) PCT Filed: May 16, 1997

(86) PCT No.: PCT/FR97/00871

§ 371 Date: Nov. 9, 1998

§ 102(e) Date: Nov. 9, 1998

(87) PCT Pub. No.: WO97/44762

PCT Pub. Date: Nov. 27, 1997

(30) Foreign Application Priority Data

May 17, 1996 (FR) .................................................. 96 106382

(51) Int. Cl.[7] .............................. H04B 1/38; H04M 1/66; G06F 7/00; G06K 5/00
(52) U.S. Cl. .............................. 455/558; 455/411; 707/9; 707/100; 235/382
(58) Field of Search ..................................... 455/558, 550, 455/422, 403, 410, 411; 380/23, 25, 3; 705/41, 65, 45; 235/380, 382, 382.5, 492; 707/101, 100, 9; 713/165, 172, 193; 711/15

(56) References Cited

U.S. PATENT DOCUMENTS 5,544,246 * 8/1996 Mandelbaum et al. ................ 380/23
5,649,118 * 7/1997 Carlisle et al. ......................... 705/41
5,802,519 * 9/1998 De Jong ....................... 340/825.34 X
6,011,976 * 1/2000 Michaels et al. ................ 455/558 X

FOREIGN PATENT DOCUMENTS 0644513   3/1995   (EP) .
0666550   8/1995   (EP) .
9430023  12/1994   (WO) .

OTHER PUBLICATIONS

Mazziotto, G. The Subscriber Identity Module For . . . P. Nordic Semina on Digital Land . . . Jun. 26–28, 1990; p. 3.1–.

* cited by examiner

Primary Examiner—Tracy Legree
(74) Attorney, Agent, or Firm—Roland Plottel

(57) ABSTRACT

A communication system comprising multiple terminal equipment (1), each consisting of a terminal (4) cooperating with a microprocessor-driven user card (SIM module; 5). Each user card includes data memory (8) comprising a plurality of objects and serving as medium to at least two separate applications, the user card comprising a microprocessor (6) and ROM (7) for executing instructions pertaining to the applications. Each object contained in the user card data memory is associated with a first defined access control policy by a set of first access conditions. Each object is also associated with at least another access control policy defined by a set of at least one alternative access condition. Each alternative access condition is applicable, for the object, to group of at least on instruction pertaining to the application (s) using the other defined access control policy. Each object is also associated with a plurality of access control policy indicators each indicating, for one of the applications, which access control policy to use with the application, the control access policy indicators being stored in the data memory (8).

22 Claims, 5 Drawing Sheets

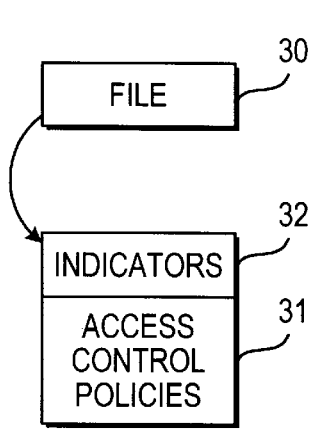

FIG. 3A

| APPLICATION | ACCESS CONTROL POLICY INDICATORS |
|---|---|
| APPLI. GSM | STANDARD ACP |
| APPLI. REM. 1 | REMOTE ACP N°1 |
| APPLI. REM. 1' | STANDARD ACP |
| APPLI. REM. 1" | REMOTE ACP N°2 |
| ⋮ | |

FIG. 3B

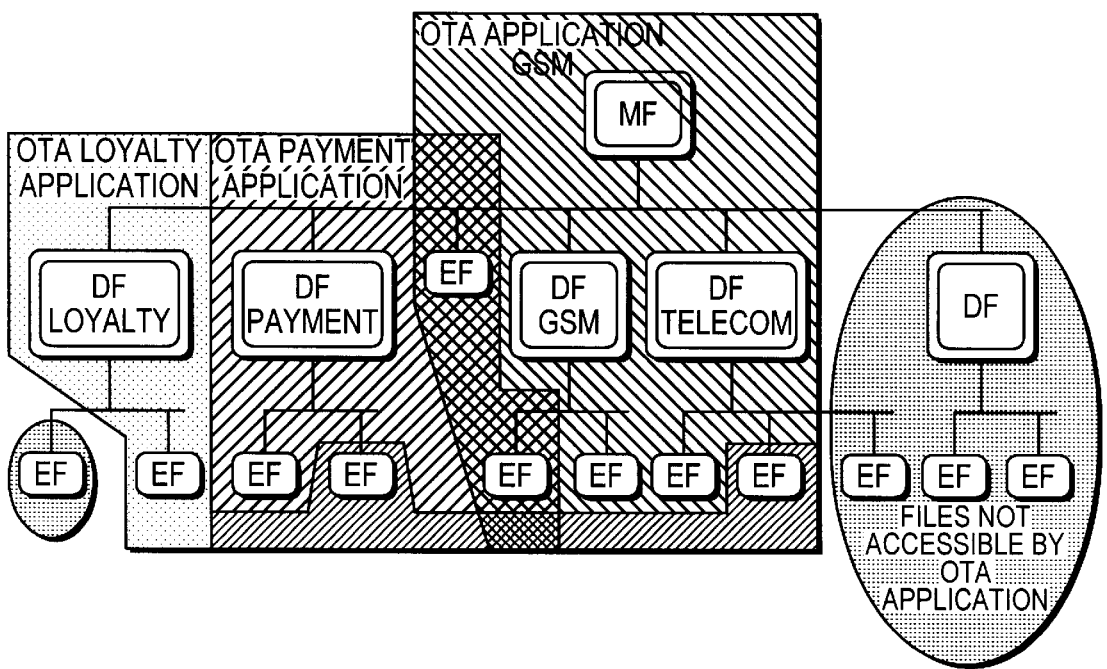

A — FILES ONLY ACCESSIBLE BY OTA LOYALTY APPLICATION
B — FILES ONLY ACCESSIBLE BY OTA PAYMENT APPLICATION
C — FILES ACCESSIBLE BY OTA PAYMENT AND LOYALTY APPLICATIONS
D — FILES ONLY ACCESSIBLE BY OTA TELECOM APPLICATION
E — FILES ACCESSIBLE BY OTA TELECOM AND LOYALTY APPLICATIONS
F — FILES ACCESSIBLE BY OTA PAYMENT AND TELECOM APPLICATIONS
G — FILES ACCESSIBLE BY OTA TELECOM, PAYMENT AND LOYALTY APPLICATIONS
H — FILES ACCESSIBLE BY ANY OTA APPLICATION

FIG. 4

COMMUNICATION SYSTEM FOR MANAGING SAFELY AND INDEPENDENTLY A PLURALITY OF APPLICATIONS BY EACH USER CARD AND CORRESPONDING USER CARD AND MANAGEMENT METHOD

BACKGROUND OF THE INVENTION

The field of the invention is that of systems communicating with terminal devices, each being a terminal cooperating with a microprocessor-driven user card.

The invention applies in particular, but not exclusively, to the case of a cellular communications system with mobile stations, each being a terminal cooperating with a user card called a Subscriber Identity Module (or SIM module).

The invention also applies, once again not exclusively, to the case of a communications system with pay stations, each being a bank terminal cooperating with a payment card.

More specifically, the invention relates to a communications system for secured, independent management of a plurality of applications by each user card. The invention also relates to a user card and a corresponding management method.

DESCRIPTION OF THE RELATED ACT

The disadvantages of known communications systems are presented below using the example of a cellular communications system. It is clear, however, that the invention is not limited to this type of system, but relates more generally to any communications system in which a user card, designed to cooperate with a terminal, supports several applications.

In the field of cellular communications, the GSM standard ("Global System for Mobile communications operating in the 900 MHz band") is known, primarily in Europe.

The invention applies in particular, but not exclusively, to a system according to this GSM standard. More generally, it is applicable to all systems in which each user card can manage at least two separate applications.

In the case of a cellular communications system, a terminal is a piece of physical equipment used by a network user to access the telecommunication services offered. There are different types of terminals such as portables, or mobiles mounted on vehicles.

When a terminal is used by a user, the latter must connect his user card (SIM module), which is generally in the form of a smart card, to the terminal.

The user card supports a principal telephone application (for example the GSM application) which allows it, as well as the terminal to which it is connected in the cellular communications system, to operate. In particular, the user card provides the terminal with which it is connected with a unique subscriber identifier (or IMSI identifier, standing for "International Mobile Subscriber Identity"). For this purpose, the user card includes command execution means (for example a microprocessor and a program memory) and data storage means (for example a data storage).

The IMSI identifier, as well as all the individual information about the subscriber, to be used by the terminal, are stored in the data storage means of the SIM module. This enables each terminal to be used with any SIM module.

In certain known systems, particularly in a GSM system, there is a short message service (SMS) for sending short messages to mobile stations. These messages are transmitted by a short message service center (SMS-C).

When a mobile station receives a short message, it stores it in the data storage means of its SIM module. The principal telephone application of each SIM module [*] to handle each short message received.

Originally, the only function of a short message was to provide information to the subscriber, generally via a terminal display screen. The short messages, known as normal short messages, that fulfilled this single function thus contain only raw data. Subsequently, an enhanced short message system (ESMS) was designed in which two types of short messages could be sent, namely the normal short messages referred to above and enhanced short messages which could contain commands.

Thus, European patent EP 562 890, for example, proposes transmitting commands enabling this SIM module to be updated or reconfigured remotely, to an SIM module, by means of enhanced short messages. In other words, commands embedded in enhanced short messages modify the principal telephone application of the SIM module.

It has also been proposed that the SIM module serve to support applications other than the principal telephone application, such as in particular automobile leasing, payment, or customer loyalty.

Since the commands belonging to these other applications are contained in enhanced short messages, which are accordingly outside the SIM module, these other applications are known as "remote" or "remote." On the other hand, the principal telephone application, whose commands are contained in the data storage means of the SIM module, is known as "local." The commands are also known as "local" or "remote" depending on whether the application to which they belong is itself local or remote.

Patent PCT/GB/9401295 describes for example an SIM module supporting the following remote applications: updating telephone numbers remotely, renting (a vehicle or hotel room in particular), and payment. Each message includes a data follow-up command. For example, the following four types of remote commands (of 255 possible commands) are presented:

Write commands, for storing data contained in the messages received in the SIM module, from a specified memory location;

Read commands, for reading data into the SIM module, from a specified memory location, the data read being placed in messages going to outside callers;

Lock/unlock commands authorizing or prohibiting writing and reading of specified memory locations in the SIM module;

Run program commands, for running a program stored in the SIM module.

With these remote commands, one can thus execute remote applications (leasing, payment, reconfiguration of principal telephone application, etc.). One can also add new functionalities to the SIM module. Thus, the SIM module can become a multi-service card with, for example, the features of a credit card, a passport, a driving license, a member card, etc.

It is clear that this recent multi-application concept of the SIM module is highly advantageous for the subscriber. The latter can now very simply carry out numerous transactions such as renting an automobile and paying for a service simply with a terminal into which his SIM module is inserted.

On the other hand, this recent multi-application concept of the SIM module, as currently implemented, has the major drawback of not independently managing each of the applications, local or remote. Indeed, in all systems known to date, the data storage files of the SIM module are accessible in the same manner by all the applications.

Thus, in the aforementioned patent, PCT/GB/9401295, access to certain memory locations by a command is always authorized, while access to other memory locations by a command may be either authorized or refused. However, whatever the memory location concerned, accessibility by a command does not depend in any way whatever on the application to which this command belongs.

Likewise, in current GSM specifications (particularly specification GSM 11.11), no difference is made between applications in terms of access conditions to the files containing the SIM module data. Each file has its own standard access control policy which is unique and defined by a set of standard access conditions, and each of these standard access conditions applies to a separate command for this file. Each standard access condition can have various values such as for example "ALWAYS" (access always authorized), "CHV1" or "CHV2" (cardholder verification), and "NEVER" (access never authorized). But none of these values is designed to link access to the file to the identity of the application to which the command requesting this access belongs.

This absence of file access control as a function of application is unsatisfactory from the standpoint of security. This means that all remote applications supported by the data storage means of a given SIM module can access all the files in these data storage means. Thus there is nothing to prevent data relating to one of these remote applications from being read or even modified by another of these remote applications. It clearly emerges from the foregoing that each remote application does not have sufficient security and confidentiality for its own data stored in the SIM module.

BRIEF SUMMARY OF THE INVENTION

The particular goal of the invention is to overcome this major drawback of the prior art.

More specifically, one of the objectives of the present invention is to provide a communication system (particularly but not exclusively a cellular communications system) in which each user card can securely and independently manage a plurality of applications.

In other words, one of the objectives of the invention is to enable each application vendor to prevent applications other than its own from accessing at least some of the objects (for example files) of the user card which support his application.

Another objective of the invention is to update (or reconfigure) user card objects which support the various applications, while ensuring that these applications continue to be managed in a secure and independent fashion.

An additional objective of the invention is to allow remote creation of a new application which, like the existing applications, is supported by objects that it alone is able to access, in the case of some of them at least.

These various objectives, and others which will appear below, are achieved according to the invention by means of a communications system of the type having in particular a plurality of terminal devices, each being a terminal cooperating with a microprocessor user card, each user card including data storage means including a plurality of objects, this data storage means serving to support at least two different applications, this user card including means for executing commands belonging to these applications, each object included in the data storage means of a user card being associated with a first access control policy defined by a set of first access conditions, each of these first access conditions applying, for this object, to a group of at least one command belonging to the application or applications using this first control access policy, characterized in that each object is also associated with at least one other access control policy, each other control access policy being defined by a set of at least one alternative access condition, each alternative access condition of another given access control policy applying, for this object, to a group of at least one command belonging to the application or applications using this other given access control policy, and in that each object is also associated with a plurality of access control policy indicators, each access control policy indicator indicating, for these applications, which access control policy, namely the first or another, is to be used with this application, these access control policy indicators being stored in this data storage means.

The general principle of the invention is thus constituted of:

associating one or more access control policies with each object (which is a file for example) in addition to the first access control policy (known in certain cases as "standard"); and for each object, indicating the access control policy (first or other) to be used with each application.

Thus, access to the object (by a command) need not be identical to all the applications. For each application, access of its various commands to an object is defined by the special access control policies that are associated with it for this object.

Advantageously, for each object, at least one other access control policy is specific to one of the applications, each alternative access condition of this other specific access control policy applying, for this object, to a group of at least one command belonging to the single application using this other specific access control policy.

Advantageously, for each object, at least one other access control policy is fully common to at least two applications, each alternative access condition of this other fully common access control policy applying, for this object, to a group of at least one command belonging to these at least two applications using this other fully common access control policy.

Advantageously, for each object, at least one other access control policy is partially common to at least two applications, whereby some of the alternative access conditions of this other partially common access control policy applies, for this object, to a group of at least one command belonging to these at least two applications using this other common access control policy, and whereby others of the alternative access conditions of this other partially common access control policy apply, for this object, to a group of at least one command belonging solely to one of these at least two applications using this other common access control policy.

Thus, for each object, each application can:

either have its own set of alternative access conditions;

or share its entire set of alternative access conditions with one or more other applications, or share only some of its set of alternative access conditions with one or more other applications.

In the simplest case, each object is associated both with the first access control policy and with another unique access control policy. The latter is defined by a single access condition, applied in a common manner to all the application commands using it.

In the most complex case, each object is associated both with the first access control policy and with as many other different access control policies as there are applications. Each of these other access control policies is defined by a plurality of different access conditions, each of which applies to one or more of the commands belonging to this other access control policy.

In a particular embodiment of the system according to the invention, of the type allowing cellular communications, the plurality of terminal devices is a plurality of mobile stations, the user cards being subscriber identity modules.

In the particular case of a cellular communications system, the plurality of applications supported by the storage means of the user card includes for example the principal telephone application (for example the GSM application), and:
either at least one remote application (for example automobile leasing, payment, or loyalty) whose commands are supplied from the outside to the command execution means of the user card (for example via enhanced short messages); and*
or at least one other local application whose commands are supplied internally to the command execution means of the user card (for example from a ROM program memory of this user card).

It should be noted that the first situation is more frequent than the second because a user card generally supports only one local application, namely the principal telephone application. However, the second situation may also be contemplated.

Thus, according to the invention, in the particular case of a cellular communications system, each user card can manage all or some of the applications it supports in a secure way.

In one advantageous embodiment of the invention, the system is of the type also including at least one message service center,
the data storage means of a user card serving to support at least one local application and at least one remote application of the user card, the commands being termed "local" when they belong to the local application or "remote" when they belong to the remote application,
each terminal being able to receive messages of the normal or enhanced type transmitted by the message service center, each user card including means for storing and processing messages received by the terminal with which it cooperates,
whereby the normal messages containing raw data constitute information to be furnished to the subscriber by means of, in particular, a terminal display screen, with the enhanced messages containing remote commands,
the system is characterized in that the data storage means of each user card also store a list of authorized remote applications,
and in that each user card also includes enhanced message discrimination means enabling each enhanced message containing remote commands not belonging to one of the authorized remote applications to be blocked.

Thus the user card detects whether the remote application transmitting the enhanced message is authorized to access this user card. This discrimination operation constitutes an additional security level for access by the commands to the data storage of the user card.

The normal or enhanced messages are for example short messages according to the GSM vocabulary.

Preferably, the data storage means of each user card also store, for each of the authorized remote applications, a secret reference and an associated message authentication mode, and each user card also includes discriminated enhanced message authentication means enabling a discriminated enhanced message to be authenticated using the secret reference and the message authentication mode associated, in the data storage means, with the authorized remote application to which the commands contained in the discriminated enhanced message belong.

In other words, a user card authenticates each enhanced message discriminated according to the authentication mode and secret reference associated with the application transmitting this message. This authentication operation constitutes yet another additional security level for access by the commands to the data storage of the user card.

Advantageously, for each object, the, or at least one of the, other access control policies, known as second access control policy, is defined by a set of at least one special alternative access condition, each special alternative access condition being able to assume in particular the following values:
"no access": if the object is not accessible by any command in the group of at least one command to which the special alternative access condition applies;
"private access": if the object is accessible only by the commands belonging to a single predetermined application, among the group of at least one command to which the special alternative access condition applies;
"shared access": if the object is accessible by the commands belonging to at least two predetermined applications, within the group of at least one command to which the special alternative access condition applies.

In one particular embodiment of the invention, for each object, at least one other access control policy, known as remote access control policy, is defined by a set of at least one remote access conditions, each remote access condition applying, for this object, to a group of at least one remote command belonging to the remote application or applications using the remote access control policy,
and for each object, only the access control policy indicators each associated with one of the remote applications is able to indicate the remote access control policy.

In this particular embodiment, the access of each object to each remote application can be either authorized or prohibited, provided, of course, that the remote access control policy is the one that actually should be used with this remote application.

For each object, the following may be provided:
either a separate remote access control policy for each separate application;
or the same remote access control policy for at least some of the remote application (or for all of them).

It should be noted that, with the exception of the first access control policy, the single access control policy or all the other access control policies are remote access control policies while the first access control policy must necessarily be used with the local application or applications.

Advantageously, for each object, each remote access condition can assume the same values as the special alternative access conditions.

Thus it is possible to partition the data storage of the user card between the various remote applications. Some objects can be rendered accessible:
either ("no access") by any remote command, whatever the remote application to which this remote command belongs;
or ("private access") only by all or some of the commands belonging to one unique remote application, known as the parent application of this object;
or ("shared access") by all or some of the commands belonging to certain specific remote applications.

In this way, all the objects with a private access linked to one and the same remote application constitute a secured, sealed barrier specific to this parent application and inaccessible to the other applications. The vendor of a given remote application is thus assured that distant applications other than his own cannot access the secured area assigned to him.

In one advantageous embodiment of the invention, wherein the data storage means of each user card of the type has a hierarchical structure with at least three levels and has at least the three following types of files:

master file;

specified file, or subdirectory, placed below the master file;

elementary file, placed below one of the specialized files, known as parent specialized file, or directly below the master file, known as parent master file, the system is characterized in that the data storage means of each user card include at least one elementary system file, each elementary system file being linked to an authorized remote application and storing a first piece of information for locating the secret reference and the message authentication mode that are associated with this authorized remote application to which it is linked, and in that each enhanced message includes a second piece of information for locating the elementary system file with which the authorized remote application to which the commands contained in the enhanced message belong is linked, whereby the authentication means read, in each discriminated enhanced message, this second piece of elementary system file locator information in order to read, into the elementary system file, this first piece of locator information for the secret reference and message authentication mode to be used to authenticate this discriminated enhanced message.

Thus each elementary system file contains information for finding the elements needed to authenticate a message transmitted by the remote application to the application to which this elementary system file is linked. For its part, every message includes (in its header) information for finding the elementary system file to which its transmitting application is linked so that it can be authenticated.

Advantageously, each elementary system file is placed under a specialized file or directly under the master file, whereby a maximum of one elementary system file can be placed under each specialized file, and a maximum of one elementary system file can be placed directly under the master file.

Preferably, if no elementary system file exists under a specialized file or under the master file, then each elementary file placed under the specialized file, whatever the value of the remote access conditions associated with this elementary file, is not accessible by any remote command, and if no elementary system file exists directly under the master file, then each elementary file placed directly under the master file, whatever the value of the remote access conditions associated with this elementary file, is not accessible by any remote command.

This means that, to be accessible by a remote command, a file must be placed under a specialized file or directly under a master file to which an elementary system file relates. The meaning of "relates" will be specified below.

Preferably, the second piece of information for locating the elementary system file is an identifier of a specialized file or a master file to which the elementary system file relates according to a predetermined search strategy in the data storage means.

Advantageously, the predetermined search strategy in the data storage means is a backtracking search mechanism which looks to see whether an elementary system file exists under the specialized file or master file indicated by this identifier and, if not, and if the identifier does not indicate the master file, looks to see whether an elementary system file exists directly under the master file.

Thus the expression "relates" used above corresponds for example to a search of the backtracking type.

In one advantageous embodiment of the invention, in the case of a file one of whose remote access conditions has the "private access" value, the predetermined unique remote application whose remote commands can access the file is, provided it is successfully authenticated, the parent authorized remote application of the file, namely the authorized remote application linked to the same elementary system file as that to which the parent specialized file or parent master file of this file relates, and, in the case of a file whose remote access condition has the "shared access" value, the at least two predetermined remote applications whose remote commands are able to access the file are, provided they are successfully authenticated, all the authorized remote applications, whatever the elementary system file to which each of them is linked.

Thus, a parent application linked to a given elementary system has child files which are all the files whose parent specialized file or parent master file (namely the specialized file or master file under which they are directly placed) relates to this given elementary system file.

The set of child files of a parent application constitutes a logical file group, also called "security domain," specific to this application. In the case of an authorized remote access of the "private" type, it is this security domain that delimits the secured area specific to the application benefiting from this privacy right.

In other words, the security domain partly includes the logically regrouping of the files according to their parent-child dependency link with one application. Each application has its security domain. This in fact means assigning a definition to the objects in the security domain of the application. The logical group of files can then be called "application security domain" or "validity domain of the security schema of the application."

Advantageously, each elementary system file has a separate set of access control policy indicators, whereby each access control policy indicator, for one of the applications, indicates what access control policy, namely the first or another, is to be used with this application, this separate set of access control policy indicators being associated with all the files whose parent specialized file or parent master file relates to this elementary system file.

The invention also relates to a microprocessor user card of the type designed to cooperate with a terminal in order to constitute a terminal device of a communications system, as referred to hereinabove, characterized in that each object of the data storage means of the user card is also associated with at least one other access control policy, each other access control policy being defined by a set of at least one alternative access condition, each alternative access condition of another given access control policy applying, for the object, to a group of at least one command belonging to the application or applications using the other given access control policy, and in that each object is also associated with a plurality of access control policy indicators, whereby each access control policy indicator indicates, for one of these applications, which access control policy, namely the first or another, is to be used with this application, the access control policy indicators being stored in the data storage means of the user card.

The invention also relates to a secured, independent method for managing at least two remote applications by a microprocessor user card of the type designed to cooperate with a terminal to constitute a terminal device of a communications system as referred to hereinabove, characterized in that, for each enhanced message received, the user card carries out in particular the following step: for each remote command contained in the enhanced message, verification of accessibility of this remote command to the object concerned, this accessibility verification being based on a first or remote access control policy, to be used for this object concerned with this current remote application.

Advantageously, for each enhanced message received, the user card also carries out a prior discrimination stage of the enhanced message in order not to continue with its processing unless the remote application, known as current remote application, to which the remote commands that it contains belong, is an authorized remote application.

Advantageously, for each enhanced message received, the user card also carries out a prior step in which it authenticates the enhanced message, using a secret reference and a message authentication mode that are associated with the current remote application.

Advantageously, at least some of the elements belonging to the following group can be created and/or updated and/or deleted by remote commands:

the access condition values, particularly the first or remote access condition values, of the access control policies associated with each object;

the access control policy indicator, particularly the first or remote access control policy indicator, to be used with each application for each object;

the list of authorized remote applications, for each of the authorized remote applications in this list, the associated secret reference and message authentication mode;

the elementary system file or files each linked to a separate authorized remote application, the elementary files (EF), specialized file (DF), and master file (MF).

Thus, securization of access to objects according to the invention can be adapted to the changing needs of each application by an update or reconfiguration.

Moreover, totally new applications (remote applications for example) can be added and supported by the smart card data storage. These new (remote) applications can benefit in the same way as the (remote) applications originally provided from individual access security (for example with a specific authentication mode, a specific secret reference, and a specific security schema).

Other characteristics and advantages of the invention will appear from reading the following description of a preferred embodiment of the invention provided as an indicative and nonlimiting example, and the attached drawings, wherein:

BRIEF DESCRIPTION OF THE DRAWINGS

FIG. 3A shows schematically a particular embodiment of a data storage file in FIG. 1, with its associated access control polices and indicators;

FIG. 3B shows an example of a plurality of indicators as associated with a file like presented in FIG. 3A;

FIG. 4 shows a first example of partitioning the data storage of FIG. 1 between several applications;

DETAILED DESCRIPTION OF THE INVENTION

In the specific embodiment described below, solely as an example, the communications system is a cellular communications system of the GSM type. It is clear however that the invention is not limited to this particular type of communications system but relates more generally to all communications systems having a plurality of terminal devices, each composed of a terminal cooperating with a microprocessor user card.

Figure 1:
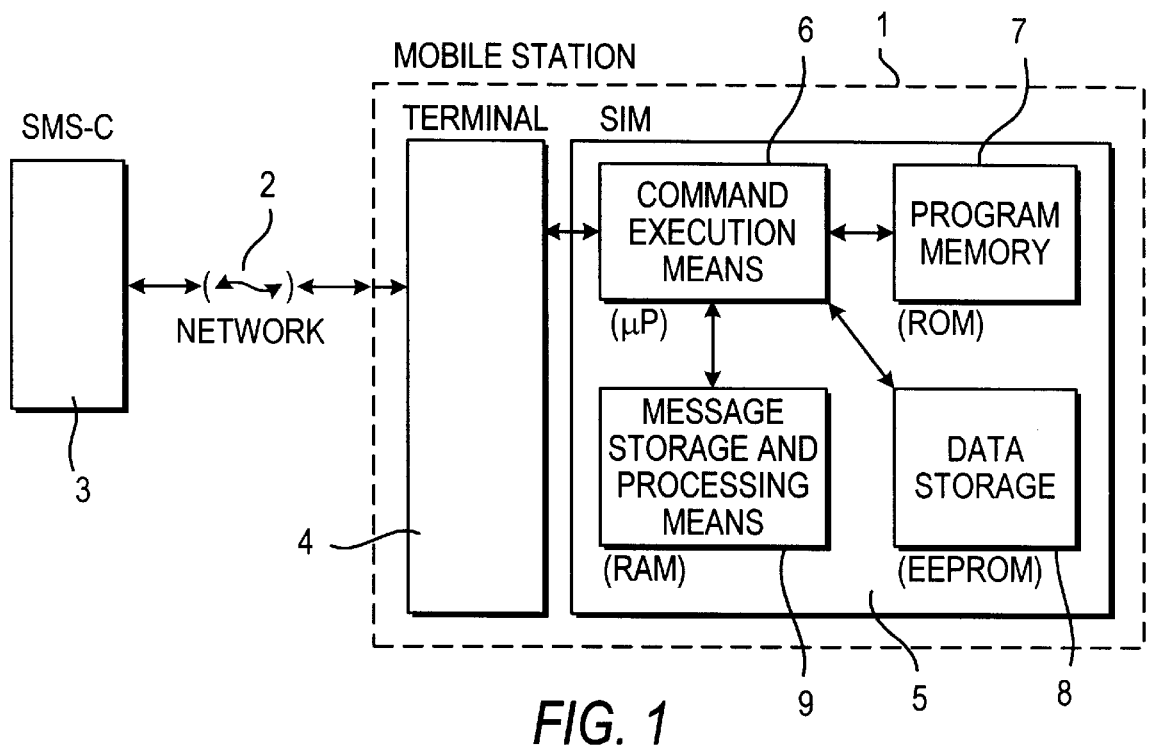
FIG. 1 is a simplified flowchart of a particular embodiment of a cellular communications system according to the invention.

For simplicity's sake, FIG. 1 shows only one mobile station (MS) 1 connected via a network 2 to a short message service center (SMS-C) 3. In actual fact, the system has a plurality of mobile stations 1, each being a terminal (ME) 4 cooperating with a subscriber identify module (SIM module) 5.

Each SIM module 5 has in particular and classically:

Command execution means 6, generally constituting a microprocessor;

A program memory 7 storing the GSM application (or more generally, the principal telephone application) and possibly other local applications. This program memory 7 is for example a ROM memory;

A data storage 8 supporting all the applications, local or remote, that the SIM module can execute. In other words, it stores all the data that the supported applications must be able to access while they are being executed. For example, it stores all the individual subscriber information (such as in particular his international subscriber number (IMSI identifier), his individual authentication key (Ki), and the authentication algorithm (A3)) necessary for executing the GSM application. This data storage 8 is for example an EEPROM memory.

Means (9) for storing and processing short messages received. Each short message received by terminal 4 is transmitted to SIM module 5 for processing by the GSM application.

The SMS-C 3 employs an enhanced short message service (ESMS) that can send two types of short message to all the mobile stations 1, namely:

"Normal" short messages which carry only raw data. The raw data in a normal short message is the information to be displayed on a screen of terminal 4, for example to request a subscriber to call back a different number;

"Enhanced" short messages which carry commands belonging to so-called remote (or OTA) applications because the commands (also known as "remote") that constitute them are not stored in program memory 7 of the SIM module.

Figure 2:
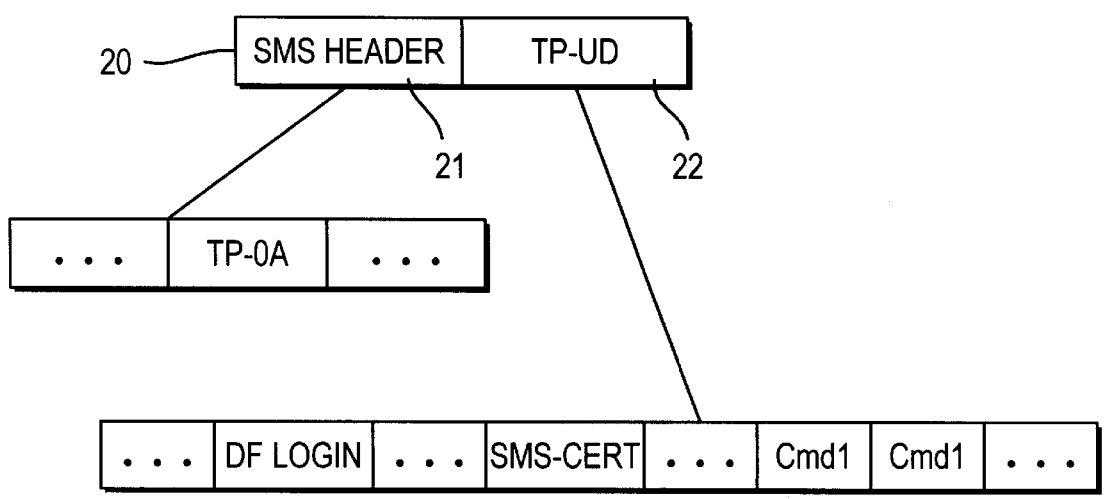
FIG. 2 shows the structure of a particular embodiment of an enhanced short message according to the invention received by the SIM module of FIG. 1.

FIG. 2 presents the structure of a particular embodiment of an enhanced short message according to the invention received by SIM module 5. This enhanced short message 20 has an SMS header 21 and a body 22 (TP-UD, standing for Transfer Layer Protocol—User Data"). Remote commands Cmd1, Cmd2, etc. are placed in body 22. These are for example the classical commands (operational or administrative), defined in standards GSM 11.11, ISO 78.16-4, or EN 726-3 such as SELECT, UPDATE BINARY, UPDATE RECORD, SEEK, CREATE FILE, CREATE RECORD, EXTEND, etc. The other fields to which the present invention relates are presented in detail in the remainder of the description.

Data storage 8 has a plurality of files. Classically, as specified in GSM 11-11, each of these files is associated with a standard access control policy. This is defined by a plurality of standard access conditions (AC standard), each applying to a separate command that can access this file. Each standard access condition can assume different values (for example "ALWays", "CHV1", "CHV2", or "NEVer"). None of these values is a function of the application to which the command that wishes to access the file belongs.

The general principle of the invention also involves associating the following with each file of data storage 8:

at least one other access control policy, each other access control policy being defined by a set of at least one alternative access conditions, whereby each alternative access condition of another given access control policy applies, for this file, to a group of at least one command belonging to the application or applications utilizing this other access control policy; and for each of the supported applications, an access control policy indicator indicating which access control policy, i.e. standard or other, is to be used with this application.

For simplicity's sake, in the example presented in the description below, the applications do not each have their own other access control policy for each file (with their own set of alternative access conditions) but all completely share (i.e. for all their commands without distinction) two other common access control polices (each with a single access condition applying to all the commands).

FIG. 3A shows schematically a particular embodiment of a file 30 of data storage 8 with its access control policies 31 and associated indicators 32. The table in Appendix 1 presents for example a plurality of access control policies such as those associated with this file 30. FIG. 3B presents one example of a plurality of indicators 32 as associated with file 30.

In the following example of characteristics associated with a file 30, described in relation to FIG. 3B and the table in Appendix 1, the following are the case:

the SIM module supports the GSM application (single local application) and three remote applications (rem. appl. 1, rem. appl. 1', and rem. appl. 1");

there is one standard access control policy (standard ACP) and two remote access control polices (remote ACP no. 1 and remote ACP no. 2).

As shown in the table of Appendix 1, in the standard access control policy, each command (remote or local), whatever the application to which it belongs (GSM application or one of the remote applications) is associated with a specific standard access condition (std. access cond. 1, std. access cond. 2, . . . ). Classically, each standard access condition has a value belonging to the group including: "ALWAYS" (access always authorized), "CHV1" or "CHV2" (access authorized after verification of the SIM module cardholder), and "NEVER" (access never authorized).

In remote access control policy no. 1, all the remote commands (for simplicity's sake), whatever the application to which they belong, are associated with the same remote access condition (also for simplicity's sake) (rem. access cond. 1). This remote access condition can for example assume one of the following values: "SHARED", "PRIVATE", and "NEVER." Thus, in this example it has the value "SHARED."

The meanings of each of these three values will now be explained:

"NEVER" (or "no access") means that file 30 is not accessible by any command, whatever the application to which this command belongs.

"PRIVATE" (or "private access") means that file 30 is accessible only by the commands belonging to a single predetermined application;

"SHARED" (or "shared access") means that file 30 is accessible by the commands belonging to at least two predetermined applications.

It will be noted that the three values "SHARED", "PRIVATE", and "NEVER" are discussed in the description below with relation to FIGS. 9 to 11.

In remote access control policy no. 2, all the remote commands, whatever the application to which they belong, are associated with the same remote access condition (rem. access cond. 2). This remote access condition can for example assume a value X taken from a different group of values (X, Y, Z, . . . ) than that referred to above (and including the "SHARED", "PRIVATE", and "NEVER" values).

As shown in FIG. 3B, for each of the supported applications (GSM appl., rem. appl. 1, rem. appl. 1', and rem. appl. 1") an access control policy indicator specifies which access control policy is to be used with this application (namely standard ACP, remote ACP no. 1, or remote ACP no. 2).

Thus, data storage 8 (and more specifically the set of files using one and the same remote access control policy) can be partitioned as a function of the various remote applications supported by this data storage.

In the examine shown in FIG. 4, all the files in the data storage use remote access control policy no. 1. Thus, viewed from the outside (i.e. for remote applications), the data storage appears to be shared between one local application and three remote applications (Loyalty, Payment, and GSM). It will be noted that, in this example, the application known as GSM is not local but remote.

Data storage 8, in the embodiment shown as an example, has a three-level hierarchical structure and has the following three types of files:

a master file (MF) or root directory;

a plurality of specialized files (DF, $DF_{Loyalty}$ $DF_{Payment}$ $DF_{GSM}$ $DF_{Telecom}$) which are subdirectories placed under the master file;

a plurality of elementary files (EF), each placed either under one of the specialized files (in this case known as "parent specialized file") or directly under the master file (in this case known as "parent master file").

There are eight groups of files, namely,

Group A: Files accessible only by the commands of the Loyalty remote application, namely files whose remote access condition is "PRIVATE" for the Loyalty application;

Group B: Files accessible only by the commands of the Payment remote application;

Group C: Files accessible by the commands of the Loyalty and Payment applications, namely the files whose remote access condition is "SHARED" by the Loyalty and Payment applications;

Group D: Files accessible only by the commands of the Telecom remote application.
Group E: Files accessible by the commands of the Telecom and Loyalty remote applications;
Group F: Files accessible by the commands of the Payment and Loyalty remote applications:
Group G: Files accessible by the commands of the Telecom, Payment, and Loyalty remote applications;
Group H: Files not accessible by the commands of any remote application, namely files whose remote access condition is "NEVER."

It should be noted that the group H files remain accessible to the local application commands (provided the corresponding standard access conditions are verified). Likewise, the group H files would be accessible to the remote application commands using the standard access control policy and not the remote access control policy (provided once again that the corresponding standard access conditions are verified).

Figure 5:
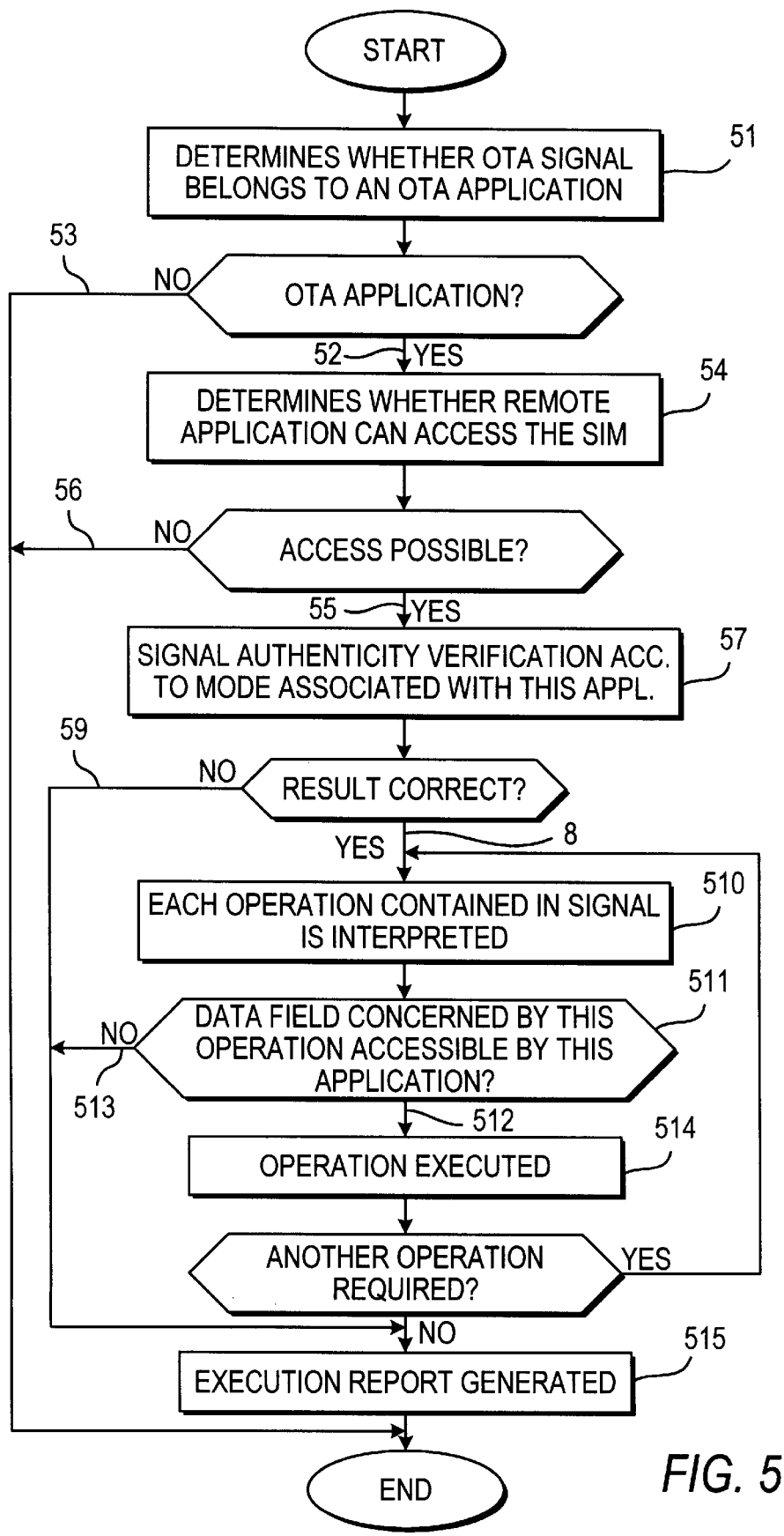
FIG. 5 is a simplified flowchart of a particular embodiment wherein an enhanced short message is processed by the SIM module in FIG. 1.

In relation to the flowchart in FIG. 5, we will now present a particular embodiment of the method whereby the SIM module processes an enhanced short message. For each enhanced short message received, the SIM module carries out in particular the following steps:

determines (51) whether the short message received (also called remote signal) is an enhanced short message (and thus contains commands belonging to a remote application) or a normal short message;
continues processing (52) in the case of an enhanced short message and interrupts it (53) in the contrary case;
determines (54) whether the remote application transmitting the message (i.e. the application whose commands are contained in the message) is an authorized remote application (step 4 of application discrimination);
continues (55) processing in the case of an authorized remote application and interrupts it (56) in the contrary case;
verifies (57) the authenticity of the message using a secret reference and a message authentication mode that are associated with the remote application transmitting the message (message authentication step 57);
continues (58) processing if the authentication is correct and interrupts it (59) if it is not;
for each remote command contained in the message:
it interprets (510) each remote command (also called operation) contained in the message;
verifies (511) accessibility of this remote command to the file concerned (also called data field) as a function of the access control policy (standard or remote) to be used for the file concerned with the remote application transmitting the message (command execution securization step 511);
continues (512) processing if the remote command can access the file and, if not, goes on (513) to report-generating step 515;
executes the (514) command and
generates (515) an execution report.

Figure 6:
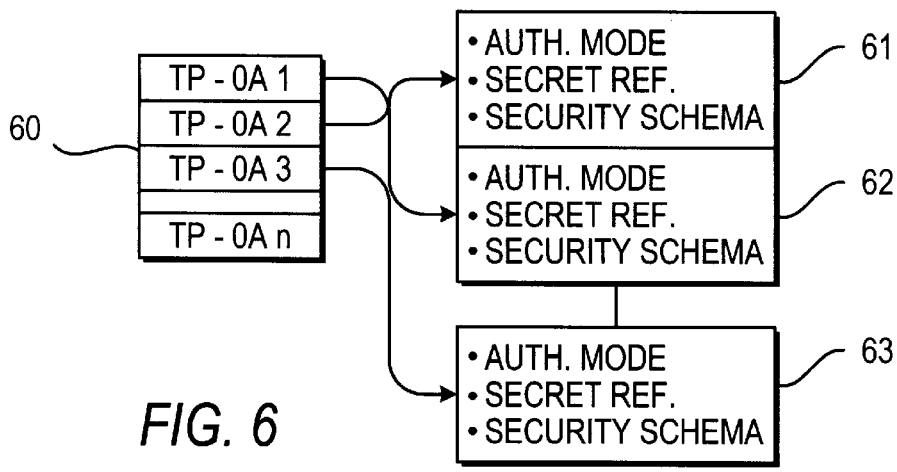
FIGS. 6 and 7 show in detail the application filtering and message authentication steps in FIG. 5.
Figure 7:
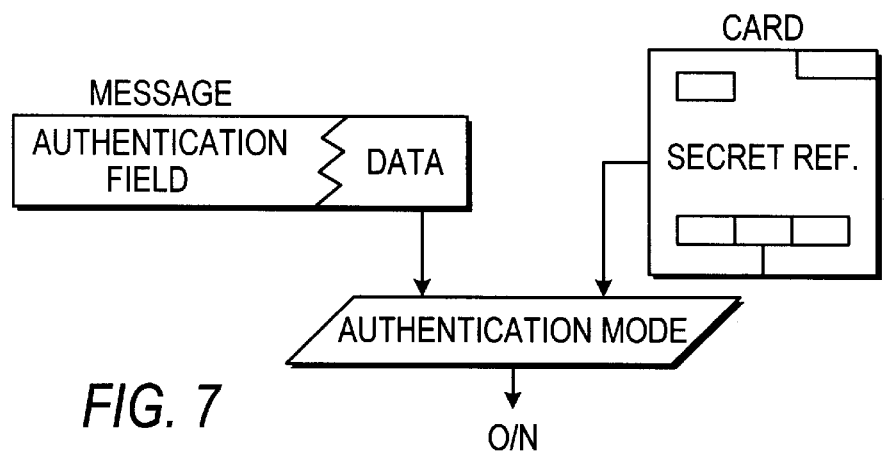
Figure 8:
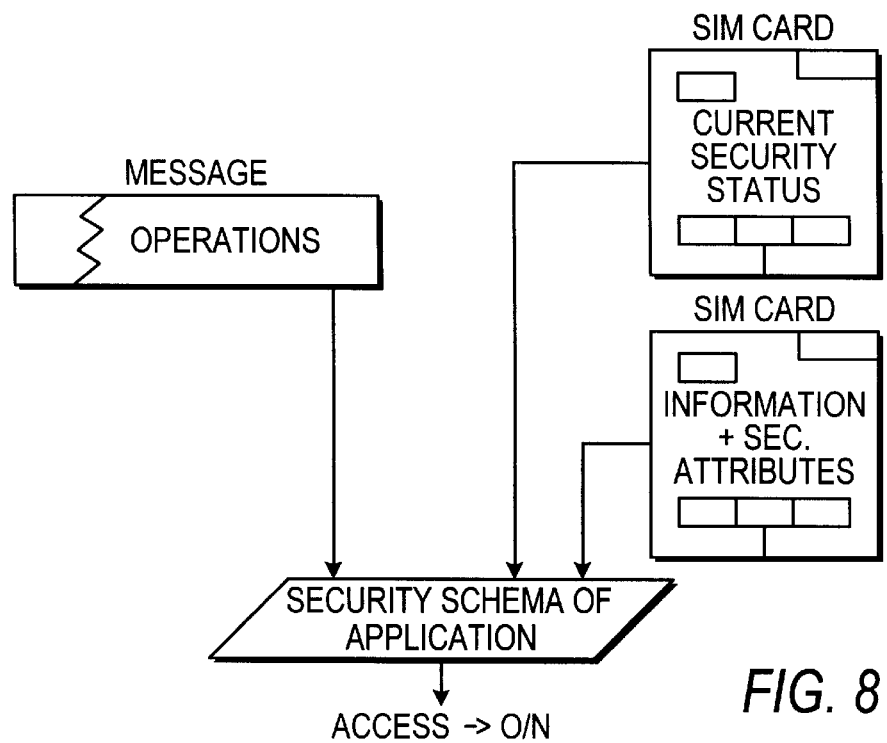
FIGS. 8 and 9 show in detail the command execution securizing step in FIG. 5.

FIGS. 6, 7, and 8 illustrate application discrimination step 54 and message authentication step 57.

As shown in FIG. 6, a file 60 of data storage 8 stores a list of authorized remote applications. This file 60, called elementary login file (or EF SMS Log) contains for example the addresses (TP-OA 1 to TP-OA n) of all the vendors of the authorized remote applications. These addresses are called TP-OA, with "OA" standing for Originating Addresses. Also, each enhanced short message includes a "TP-OA" field in its header (see FIG. 2).

Thus, in application discrimination step 54, the SIM module identifies the remote application transmitting the message and makes sure that the TP-OA address of the message is identical to one of the TP-OA addresses in the elementary login file 60.

FIG. 6 also illustrates the fact that, for each TP-OA address (namely each authorized remote application) of elementary login file 60, the SIM module is able to access a set 61 to 63 of three parameters in data storage 8: a secret reference (Kappli), a message authentication mode (algo__id), and a security schema.

Thus, as illustrated in FIG. 7, to carry out message authentication step 57, the SIM module uses the secret reference (Kappli) and the message authentication mode (algo__id) that are associated with the message-transmitting application, which it previously found in data storage 8. Based on these two parameters (Kappli and algo__id) and the message body data, the SIM module calculates for example a cryptogram which must be identical to a cryptogram (SMS-Cert) contained in the message body (see FIG. 2) in order for message authentication to be successful.

FIG. 8 shows step 511 in which execution of a command is secured. Each command (or operation) of a message is actually executed only if, according to the current security status of the SIM module and the security information and attributes linked to the remote message-transmitting application, this command is authorized to access the files on which it is working. This corresponds to the security schema of the remote application.

The next part of the description presents a particular embodiment of the invention wherein each authorized remote application is associated with an elementary system file (EF SMS System) of data storage 8.

Each elementary system file stores a first piece of information that enables a pair (secret reference Kappli, message authentication mode algo__id) to be located in data storage 8, this pair being associated with the authorized remote application to which this elementary system file is linked.

In the present embodiment, this first piece of locator information about a pair (Kappli, algo__id) is an identifier of a specialized file under which the EF key__op file containing this pair is located. The EF key__op file can itself store the message authentication mode or just an algo__id pointer indicating the storage location of this message authentication mode.

In addition, each enhanced short message includes a second piece of information locating the elementary system file to which the authorized remote application transmitting the enhanced short message is linked.

As shown in FIG. 2, in the present embodiment, this second piece of elementary system file-locating information is a "Login DF" identifier of a specialized file or a master file to which this elementary system file relates, according to a predetermined search strategy in the data storage means.

For example, the SIM module implements a search mechanism of the backtracking type namely:

First, looking for an elementary system file in the specified file or the current master file (namely the file indicated by the "Login DF" identifier),
Then, if no elementary system file exists under the specialized file or current master file and if the "Login DF" does not indicate the master file, looking for an elementary system file directly under the master file.

Thus, the SIM module reads the DF Id identifier in each filtered enhanced short message. From this "Login DF" it finds the elementary system file to which the authorized remote application transmitting the message is linked. In this elementary system file, the SIM module reads the identifier of the specialized file in which the EF key__op file is located.

In this EF key_op file, it reads the (Kappli, algo_id) pair to find out the secret reference and message authentication mode to be used to authenticate the filtered enhanced short message.

A maximum of one elementary system file can be placed under a specialized file. Likewise, a maximum of one elementary system file can be placed directly under the master file.

If no elementary system file exists under a specialized file, or under the master file, the EF's placed under this specialized file, whatever the value of the remote access condition associated with each of these elementary files, are inaccessible by any remote command.

Likewise, if no elementary system file exists either directly or under the master file, then the elementary files placed directly under the master file, whatever the value of the remote access condition associated with each of these elementary files, are inaccessible by any remote command.

In cases where a file whose remote access condition has the value "PRIVATE" ("private access"), the only remote application whose remote commands can access this file is, provided its authentication is successful, the authorized remote application linked to the same elementary system file as that to which the specialized file or parent master file of this file relates. This authorized remote application is called the "parent application" of this file.

If a file whose remote access condition has the value "SHARED" ("shared access"), the predetermined remote applications whose remote commands can access this file, are, provided their authentication is successful, all the authorized remote applications, whatever the elementary system file with which each of them is linked.

Figure 9:
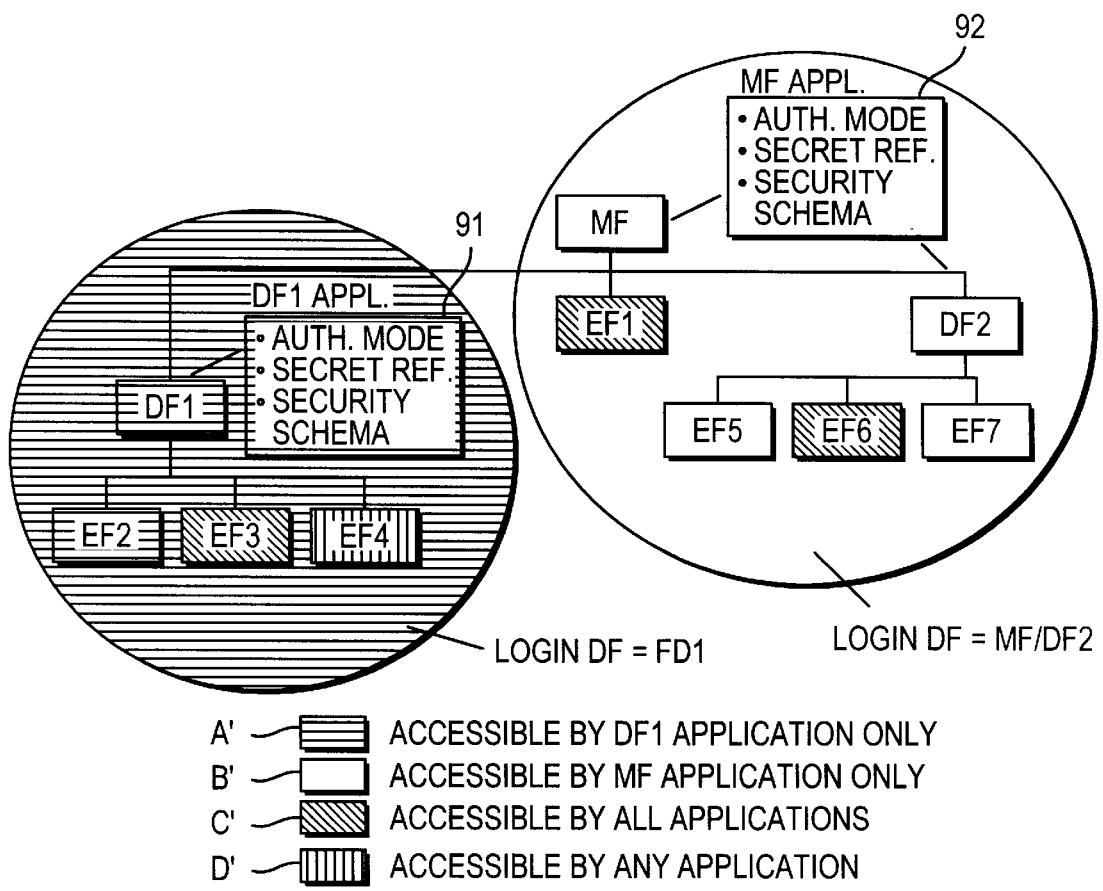

FIG. 9 shows an example of a data storage 8 shared between two remote applications, namely:
application "DF1" whose EF SMS System 91 relates to specialized file DF1; and
the "MF" application whose elementary system file 92 relates to master file MF.

It will be noted that the messages transmitted by the "DF1" application have the value DF1 in their "Login DF" field; this is the specialized file under which the elementary system file 91 of this "DF1" application is located.

On the other hand, the messages transmitted by the "MF" application have the value MF/DF2 in their "Login DF" field, not the value MF. In fact, since no elementary system file exists under this specialized file DF2, the SIM module will look in the master file (backtracking mechanism) for elementary system file 92 of this "MF" application.

In this example, a distinction is made between the following four groups of files:
Group A': Files (DF1, EF2) accessible only by the commands of remote application "DF1," namely files whose remote access condition is "PRIVATE" for the "DF " application;
Group B': Files (MF, DF2, EF5, EF7) only accessible by the commands of remote application "MF";
Group C': The files (EF3, EF1, EF6) accessible by the commands of remote applications "DF3" and "MF," namely the files whose remote access condition is "SHARED" for the "DF1" and "MF" applications;
Group D': The files (EF4) not accessible by the commands of any remote application, namely the files whose remote access condition is "NEVER."

It is important to emphasize that, by means of remote commands, it is possible with the present invention to create, update, or delete certain elements listed above, particularly:
The values of the access conditions, standard or remote, and the access control policies associated with each file;
The indicator of the access control policy, standard or remote, to be used with each application for each file;
The list of authorized remote applications;
For each of the authorized remote applications, the associated secret reference and message authentication mode.
The elementary system files EF SMS System each linked to a separate authorized remote application;
The elementary files EF, specialized files DF, and master files MF.

Figure 10:
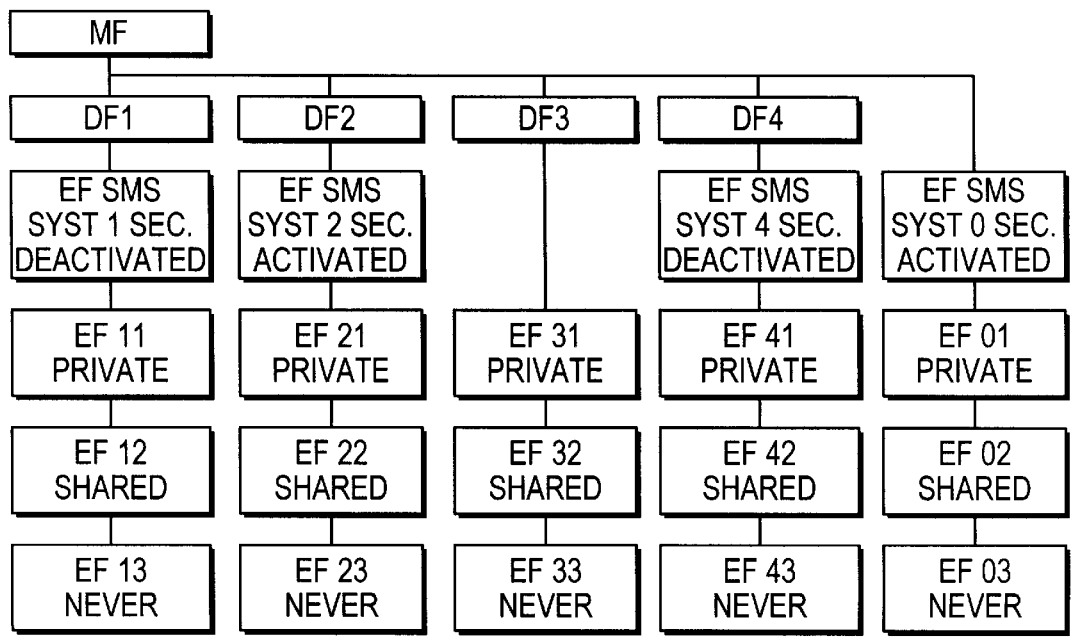
FIG. 10 shows a second example of partitioning the data storage in FIG. 1 between several applications.

FIG. 10 shows a second example of data storage 8 partitioning. In this second example, data storage 8 is shared between four remote applications, namely:
The "MF," application whose elementary system file EF SMS System 0 has activated security, relates to the master file;
The "DF1" application, whose elementary system file EF SMS System 1 has deactivated security, relates to specialized file DF1;
The "DF2" application, whose elementary system file EF SMS System 2 has activated security, relates to specialized file DF2; and
The "DF4" application whose elementary system file EF SMS System 4 has deactivated security, relates to specialized file DF4.

"Activated security," for an elementary system file, means that the access control policy indicator contained in this elementary system file provides for use of a remote access control policy. Likewise, "deactivated security," for an elementary system file, means that the access control policy indicator contained in this elementary system file provides for use of a standard access control policy.

It should be noted that specialized file DF3, and all the files placed under specialized file DF3, have "MF" for a parent application because there is no elementary system file under specialized file DF3.

Each elementary file is associated with a remote access condition value ("never", "private", or "shared").

The table in Appendix 2 summarizes the various access situations (access authorized or refused) for each elementary file in FIG. 10, as a function of the specialized file (or master file) specified in the message header.

The following is indicated for each elementary file to be accessed by the command (first column):
The remote access condition value associated with this file (first column also);
The EF ESMS System to which the file to be accessed relates (second column); and
The safety status (activated or deactivated) of this EF ESMS System (second column also).

For each specialized file (or master file) specified in the message header, the parent specialized file (or master file) of the elementary system file where message authentication is carried out is indicated. It will be noted that no message authentication is done for specialized files DF1 and DF4, whose elementary system files (1 and 4 respectively) each have deactivated security.

This table clearly shows that:
If an elementary system file exists in a specialized file, an elementary file of this specialized file whose remote access condition is "PRIVATE" cannot be accessed through a remote command contained in an authenticated message in another specialized file;
If no elementary system file exists in a specialized file but exists in the master file, an elementary file of this specialized file whose remote access condition is "PRIVATE" cannot be accessed through a remote command contained in an authenticated message in another specialized file, different from the master file and itself containing an elementary system file;

If no elementary system file exists in a specialized file, nor in the master file, no message can be authenticated under this specialized file and an elementary file of this specialized file, whatever its remote access condition, cannot be accessed through a remote command (in other words, if no elementary system file is attached to a file, all remote access_through a remote command_is prohibited);

In all cases, an elementary file whose remote access condition is "SHARED" can be accessed through a remote command contained in a message which is being authenticated.

For simplicity, we will note below:

"LA" (for "Login Appl."): The elementary system file relating to the specialized file DF specified in the message header, and "PA" (for "Parent Appl."): The elementary system file that relates to the file to be accessed.

More generally, security can then be fully and formally described with the following seven rules:

R1. If no PA file can be found, Then remote access is prohibited.

R2. If a PA file is found but the remote access condition of the file to be accessed is "PRIVATE:

Then remote access is prohibited.

R3. If a PA file is found and the remote access condition of the file to be accessed is "PRIVATE" and the PA file is not the same as the LA file:

Then remote access is prohibited.

R4. If a PA file is found and the remote access condition of the file to be accessed is "PRIVATE" and the PA file is the same as the LA file, and security is deactivated in the LA file:

Then remote access depends on the standard access conditions of the file.

R5. If a PA file is found and the remote access condition of the file to be accessed is "PRIVATE" and the PA file is the same as the LA file, and security is activated in the LA file:

Then remote access is authorized.

R6. If a PA file is found and the remote access condition of the file to be accessed is "SHARED" and security is deactivated in the LA file:

Then remote access depends on the standard access conditions of the file.

R7. If a PA file is found and the remote access condition of the file to be accessed is "SHARED" and security is activated in the LA file:

Then remote access is authorized.

Appendix 1

| Access Control Policy (ACP) | Application | Command | Access Condition | Access Condition Value |
|---|---|---|---|---|
| Standard ACP | any | command (rem or loc) 1 | std. acc. cond. 1 | ALWAYS |
| | any | command (rem or loc) 2 | std. acc. cond. 2 | CHV1 |
| | . | . | . | . |
| | . | . | . | . |
| | . | . | . | . |
| | any | command (rem or loc) k | std. acc. cond. k | NEVER |
| | remote appl. 1 | remote command 1 | | |
| | | remote command 2 | | |
| | | . | | |
| | | . | | |
| | | . | | |
| | | remote command m | | |
| remote ACP no. 1 | remote appl. 1' | remote command 1' | remote access condition 1 | SHARED |
| | | remote command 2' | | |
| | | . | | |
| | | . | | |
| | | . | | |
| | | remote command m' | | |
| | remote appl. 1" | remote command 1" | | |
| | | remote command 2" | | |
| | | . | | |
| | | . | | |
| | | . | | |
| | | remote command m" | | |
| | remote appl. 1 | remote command 1 | | |
| | | remote command 2 | | |
| | | . | | |
| | | . | | |
| | | . | | |
| | | remote command m | | |
| remote ACP no. 2 | remote appl. 1' | remote command 1' | remote access condition 2 | X |
| | | remote command 2' | | |
| | | . | | |
| | | . | | |
| | | . | | |
| | | remote command m' | | |
| | remote appl. 1" | remote command 1" | | |
| | | remote command 2" | | |
| | | . | | |
| | | . | | |
| | | . | | |

-continued

| remote command m" |
|---|

Appendix 2

| File to be accessed/ remote access conditions | EF SMS System concerned | DF specified in ESMS header | | | DF 1 | DF 4 |
|---|---|---|---|---|---|---|
| | | MF DF parent of EF SMS Syst. where message authentication done | | | no message authentication | |
| | | MF | DF 2 | MF | | |
| EF 01 (MF) private | EF SMS Syst 0 (MF) sec. activated | authorized | refused | authorized | refused | refused |
| EF 02 (MF) shared | EF SMS Syst 0 (MF) sec. activated | authorized | authorized | authorized | * | * |
| EF 03 (MF) never | EF SMS Syst 0 (MF) sec. activated | refused | refused | refused | refused | refused |
| EF 11 (DF 1) private | EF SMS Syst 1 (DF 1) sec. deactivated | refused | refused | refused | * | refused |
| EF 12 (DF 1) shared | EF SMS Syst 1 (DF 1) sec. deactivated | authorized | authorized | authorized | * | * |
| EF 13 (DF 1) never | EF SMS Syst 1 (DF 1) sec. deactivated | refused | refused | refused | refused | refused |
| EF 21 (DF 2) private | EF SMS Syst 2 (DF 2) sec. activated | refused | authorized | refused | refused | refused |
| EF 22 (DF 2) shared | EF SMS Syst 2 (DF 2) sec. activated | authorized | authorized | authorized | * | * |
| EF 23 (DF 2) never | EF SMS Syst 2 (DF 2) sec. activated | refused | refused | refused | refused | refused |
| EF 31 (DF 3) private | EF SMS Syst 0 (MF) sec. activated | authorized | refused | authorized | refused | refused |
| EF 32 (DF 3) shared | EF SMS Syst 0 (MF) sec. activated | authorized | authorized | authorized | * | * |
| EF 33 (DF 3) never | EF SMS Syst 0 (MF) sec. activated | refused | refused | refused | refused | refused |
| EF 41 (DF 4) private | EF SMS Syst 4 (DF 4) sec. deactivated | refused | refused | refused | refused | * |
| EF 42 (DF 4) shared | EF SMS Syst 4 (DF 4) sec. deactivated | authorized | authorized | authorized | * | * |
| EF 43 (DF 4) never | EF SMS Syst 4 (DF 4) sec. deactivated | refused | refused | refused | refused | refused |

*= authorized if standard access condition fulfilled

What is claimed is:

1. Communications system of the type having a plurality of terminal devices (MS), each including a terminal (4) cooperating with a microprocessor user card (5), each user card including data storage means (8) including a plurality of objects, this data storage means (8) serving to support at least two different applications, the user card including means (6, 7) for executing commands belonging to these applications, each object included in the data storage means of a user card being associated with a first access control policy defined by a set of first access conditions, each of these first access conditions applying, for the object, to a group of at least one command belonging to the application or applications using this first control access policy, characterized in that each object is also associated with at least one other access control policy, each other control access policy being defined by a set of at least one alternative access conditions, each alternative access condition of another given access control policy applying, for this object, to a group of at least one command belonging to the application or applications using this other given access control policy, and in that each object is also associated with a plurality of access control policy indicators, each access control policy indicator indicating, for these applications, which access control policy, namely the first or another, is to be used with this application, these access control policy indicators being stored in said data storage means (8).

2. System according to claim 1, characterized in that, for each object, at least one other access control policy is specific to one of the applications, each alternative access condition of this other specific access control policy applying, for said object, to a group of at least one command belonging to the single application using this other specific access control policy.

3. System according to claim 1, characterized in that, for each object, at least one other access control policy is fully common to at least two applications, each alternative access condition of this other fully common access control policy applying, for said object, to a group of at least one command belonging to said at least two applications using this other fully common access control policy.

4. System according to claim 1, characterized in that, for each object, at least one other access control policy is fully common to at least two applications, whereby some of the alternative access conditions of this other partially common access control policy apply, for said object, to a group of at least one command belonging to said at least two applications using this other common access control policy, whereby others of the alternative access conditions of this other partially common access control policy apply, for said object, to a group of at least one command belonging solely to one of said at least two applications using this other common access control policy.

5. System according to claim 1, of the type allowing cellular communications, characterized in that said plurality of terminal devices is a plurality of mobile stations (1), said user cards being subscriber identity modules 5).

6. System according to claim 1, including at least one message service center, said data storage means of a user card serving to support at least one local application and at least one remote application of said user card, the commands being termed "local" when they belong to said local application or "remote" when they belong to said remote application, each terminal (4) being able to receive messages of the normal or enhanced type transmitted by said message service center, each user card (5) including means (9) for storing and processing messages received by the terminal with which it cooperates, whereby the normal messages containing raw data constitute information to be furnished to the subscriber by means of, in particular, a terminal display screen, with the enhanced messages (20) containing remote commands, characterized in that said data storage means (8) of each user card also store a list of authorized remote applications, and in that each user card also includes enhanced message discrimination means enabling each enhanced message containing remote commands not belonging to one of said authorized remote applications to be blocked.

7. System according to claim 6, characterized in that said data storage means of each user card also store, for each of said authorized remote applications, a secret reference and an associated message authentication mode, and in that each user card also includes discriminated enhanced message authentication means enabling a discriminated enhanced message to be authenticated using the secret reference and the message authentication mode associated, in said data storage means, with the authorized remote application to which the commands contained in said discriminated enhanced message belong.

8. System according to claim 7 wherein, said data storage means of each user card having a hierarchical structure with at least three levels and having at least the three following types of files:

master file;

specified file, or subdirectory, placed below said master file;

elementary file, placed below one of said specialized files, known as parent specialized file, or directly below said master file, known as parent master file, characterized in that said data storage means of each user card include at least one elementary system file, each elementary system file being linked to an authorized remote application and storing a first piece of locator information about the secret reference and the message authentication mode that are associated with this authorized remote application to which it is linked, and in that each enhanced message includes a second piece of locator information for the elementary system file with which the authorized remote application is linked to which the commands contained in said enhanced message belong, whereby said authentication means read, in each discriminated enhanced message, said second piece of elementary system file locator information in order to read, into the elementary system file, said first piece of locator information for the secret reference and message authentication mode to be used to authenticate said discriminated enhanced message.

9. System according to claim 8, characterized in that each elementary system file is placed under a specialized file or directly under the master file, whereby a maximum of one elementary system file can be placed under each specialized file, and a maximum of one elementary system file can be placed directly under the master file.

10. System according to claim 9, characterized in that, if no elementary system file exists under a specialized file or under the master file, then each elementary file placed under said specialized file, whatever the value of the remote access conditions associated with this elementary file, is not accessible by any remote command, and in that, if no elementary system file exists directly under the master file then each elementary file placed directly under the master file, whatever the value of the remote access conditions associated with this elementary rile, is not accessible by any remote command.

11. System according to claim 10, characterized in that said second piece of information for locating the elementary system file is an identifier of a specialized file or a waster file to which said elementary system file relates according to a predetermined search strategy in the data storage means.

12. System according to claim 11, characterized in that said predetermined search strategy in the data storage means is a backtracking search mechanism which looks to see whether an elementary system file exists under specialized file or master file indicated by said identifier and, if not, and if the identifier does not indicate the master file, looking to see whether an elementary system file exists directly under the master file.

13. System according to claim 8, characterized in that, in the case of a file one of whose remote access conditions has the "private access" value, said predetermined unique remote application whose remote commands can access said file is, provided it is successfully authenticated, the parent authorized remote application of said file, namely the authorized remote application linked to the same elementary system file as that to which the parent specialized file or parent master file of said file relates, and in that, in the case of a file whose remote access condition has the "shared access" value, said at least two predetermined remote applications whose remote commands are able to access said file are, provided they are successfully authenticated, all the authorized remote applications, whatever the elementary system file to which each of them is linked.

14. System according to any one of claim 8, characterized in that each elementary system file comprises a separate set of access control policy indicators, whereby each access control policy indicator, for one of said applications, indicates what access control policy, namely the first or another, is to be used with this application, said separate set of access control policy indicators being associated with all the files whose parent specialized file or parent master file relates to said elementary system file.

15. A secured, independent method for managing at least two remote applications by a microprocessor user card of the type designed to cooperate with a terminal (4) in order to constitute a terminal device (1) of a communications system according to claim 6, characterized in that, for each enhanced message received, said user card carries out in particular the following step: for each remote command contained in said enhanced message, verification of accessibility of this remote command to the object concerned, said accessibility verification being based on a first or remote access control policy, to be used for said object concerned with said current remote application.

16. Method according to claim 15, characterized in that, for each enhanced message received, said user card also carries out a prior discrimination stage (54) of said enhanced message in order not to continue with its processing unless the remote application, known as current remote application, to which the remote commands that it contains belong, is an authorized remote application.

17. Method according to claim 15, characterized in that, for each enhanced message received, said user card also carries out a prior step (57) in which it authenticates said enhanced message, using a secret reference and a message authentication mode that are associated with said current remote application.

18. Method according to claim 15, characterized in that at least some of the elements belonging to the following group can be created and/or updated and/or deleted by remote commands:

the access condition values, particularly the first or remote access condition values, of the access control policies associated with each object;

the access control policy indicator, particularly the first or remote access control policy indicator, to be used with each application for each object;

the list of authorized remote applications, for each of the authorized remote applications in said list, the associated secret reference and message authentication mode;

the elementary system file or files each linked to a separate authorized remote application, the elementary, specialized, and master files.

19. System according to claim 1, characterized in that, for said object, the or at least one of the other access control policies, known as second access control policy, is defined by a set of at least one special alternative access conditions, each special alternative access condition being able to assume in particular the following values:

"no access": if said object is not accessible by any command in said group of at least one command to which said special alternative access condition applies;

"private access": if said object is accessible only by the commands belonging to a single predetermined application, among said group of at least one command to which said special alternative access condition applies;

"shared access"; if said object is accessible by the commands belonging to at least two predetermined applications, within said group of at least one command to which said special alternative access condition applies.

20. System according to claim 19, characterized in that, for each object, at least one other access control policy, known as remote access control policy, is defined by a set of at least one remote access conditions, each remote access condition applying, for said object, to a group of at least one remote command belonging to the remote application or applications using said remote access control policy, and in that, for each object, only the access control policy Indicators each associated with one of the remote applications is able to indicate said remote access control policy.

21. System according to claim 20, characterized in that, for each object, each remote access condition can assume the same values NEVER, PRIVATE, SHARED as said special alternative access conditions.

22. Microprocessor user card of the type designed to cooperate with a terminal in order to constitute a terminal device of a communications system according to claim 1, characterized in that each object of the data storage means of said user card is also associated with at least one other access control policy, each other access control policy being defined by a set of at least one alternative access condition, each alternative access condition of another given access control policy applying, for said object, to a group of at least one command belonging to the application or applications using said other given access control policy, and in that each object is also associated with a plurality of access control policy indicators, whereby each access control policy indicator indicates, for one of said applications, which access control policy, namely the first or another, is to be used with this application, said access control policy indicators being stored in the data storage means (8) of said user card.

* * * * *